United States Patent
Berger et al.

(10) Patent No.: US 8,306,925 B2
(45) Date of Patent: Nov. 6, 2012

(54) SYSTEM AND METHOD FOR MANAGING QUANTITY TIERS USING ATTRIBUTES IN AN ONLINE STATIONERY DESIGN SYSTEM

(75) Inventors: Kelly Berger, Los Altos, CA (US); Max Vuong, San Jose, CA (US); Mohammed Pedhiwala, Fremont, CA (US)

(73) Assignee: Shutterfly, Inc., Redwood City, CA (US)

( * ) Notice: Subject to any disclaimer, the term of this patent is extended or adjusted under 35 U.S.C. 154(b) by 292 days.

(21) Appl. No.: 12/641,078

(22) Filed: Dec. 17, 2009

(65) Prior Publication Data

US 2011/0153399 A1    Jun. 23, 2011

(51) Int. Cl.
*G06Q 99/00* (2006.01)
(52) U.S. Cl. ........ 705/400; 705/1.1; 705/10; 705/14.23; 705/14.46
(58) Field of Classification Search ............... 705/14.23, 705/14.53, 26.1, 400, 10, 14.46, 1.1
See application file for complete search history.

(56) References Cited

U.S. PATENT DOCUMENTS

| | | | |
|---|---|---|---|
| 5,552,994 A | | 9/1996 | Cannon et al. |
| 5,600,563 A | | 2/1997 | Cannon et al. |
| 5,748,484 A | | 5/1998 | Cannon et al. |
| 5,751,590 A | | 5/1998 | Cannon et al. |
| 5,878,400 A | * | 3/1999 | Carter, III ........................ 705/20 |
| 2002/0087404 A1 | * | 7/2002 | Silkey et al. ..................... 705/14 |
| 2003/0221162 A1 | | 11/2003 | Sridhar |
| 2004/0107125 A1 | | 6/2004 | Guheen et al. |
| 2004/0267674 A1 | * | 12/2004 | Feng et al. .................... 705/400 |
| 2005/0038733 A1 | * | 2/2005 | Foster et al. .................... 705/37 |
| 2006/0178918 A1 | | 8/2006 | Mikurak |
| 2006/0190808 A1 | | 8/2006 | Balthaser |
| 2009/0125419 A1 | * | 5/2009 | Barney ............................ 705/27 |
| 2009/0234707 A1 | * | 9/2009 | Perez et al. ..................... 705/10 |
| 2010/0114687 A1 | * | 5/2010 | Zamora et al. ............. 705/14.23 |
| 2011/0040618 A1 | * | 2/2011 | Wagenblatt ................ 705/14.46 |

OTHER PUBLICATIONS

"The Great Non-Food Gamble", Sep. 20, 2003; Grocer, 2 pages.*

* cited by examiner

*Primary Examiner* — John Hayes
*Assistant Examiner* — Freda A Nelson
(74) *Attorney, Agent, or Firm* — Xin Wen (57) ABSTRACT

A computer-implemented system and method are described in which an appropriate pricing structure for a new stationery design is identified by automatically comparing attributes of the stationery design with attributes of existing stationery designs which have assigned pricing structures. In one embodiment, the attributes are prioritized such that certain attributes are weighted more than other attributes when determining an appropriate price structure. For example, in this embodiment, a search is initially performed for a price structure of an existing stationery product which shares all of the same attributes as the new stationery product. If a match is not found, then the least significant attribute is removed from the set of search criteria and another search is performed. This process continues until an existing pricing structure of a stationery product which shares the most significant attributes of the new stationery product is identified. Once the pricing structure is identified, the designer has the option to modify the pricing structure and create a new pricing category, which is then stored in a database with other pricing categories.

12 Claims, 11 Drawing Sheets

Search for a price category

Fulfillment Item Type: Boatman Geller  ← 800a
Price Category: bg-4.1x5.25flat-boy_birth-0phot ← 800b

[Save Changes]

Edit price structure  ← 801

Start Value [ ]  Increments [ ]  Unit Price [ ]  Price Break Increments [ ]  End Value [ ]  [Override] [Append]
                                                                                               ↑        ↑
                                                                                              802      803

| Start Value | Increments | Unit Price |
|---|---|---|
| 25 | 25 | 5.40 |
| 50 | 25 | 3.70 |
| 75 | 25 | 3.31 |
| 100 | 25 | 2.90 |
| 125 | 25 | 2.92 |

Submit CSV  [Browse...]

View Scheduled Pricing  ← 804

Max Quantity [2]

Pre-ship Envelopes [☑]
Pre-ship Envelopes Price [10]

Email Proof Available [☑]
Email Proof Required [☑]
Email Proof Price [2]

Rush Processing [☑]
Rush Processing Price [2]

Customization [☑]
Customization Price [2]

Copy price structure to

← 805

Products

| ID | Name | Size | Paper Type | Occasion | # Photos (1st panel) | # Envelope | # Inks | Class |
|---|---|---|---|---|---|---|---|---|
| 542 | Plaid Pattern Blue | 4.1 x 5.25 flat | | boy birth announce | 0 | 1 | 0 | Boy Birth Announce |
| 543 | Classic Seersucker Blue | 4.1 x 5.25 flat | | boy birth announce | 0 | 1 | 0 | Boy Birth Announce |

Page [1] of 1   Show 25  Show 100  Show 1,000  Show 10,000    Displaying products 1 - 2 of 2

View Better Matching Products

*Fig. 8* products tools setup orders mailist affiliates reports
colors envelopes typefaces pricing partners papers promocodes vendorinvoices categoryfilters promotions
setup and summary adjust discount ✱Add new discount group ← 901

> tiny*prints

✱ Delete Group

Status 903 Draft
Discount Group Name [TestDiscount]
Select date range from [05/21/2009] to [05/22/2009]

✱Add new discount ← 907

Discount1 ← 904

Discount name [Discount]
Discount amount [10] % off ← 906

← 902
← 905

✱ Delete Discount

Select price category

| Fulfillment Item Type 910 | Card Size 911 | Paper Type 912 | Occasion 913 |
|---|---|---|---|
| ☐ Address Labels<br>☐ Boatman Geller<br>☐ Card Kits<br>☐ Digital Press Cards<br>☐ Gift Tags<br>☐ Letterpress Cards<br>☐ Meta Sample Cards | ☐ (A) 4.1 x 5.25 flat<br>☐ (B) 5 x 7 Flat<br>☐ (C) 4 x 9.25 Flat<br>☐ (D) 3.5 x 5 Flat<br>☐ (E) 4.25 x 5.5 Folded<br>☐ (F) Gift Tags<br>☐ (G) Address Labels | ☐ TP100DS<br>☐ TP110DS<br>☐ TP110SS<br>☐ TP110MDS<br>☐ TP100SS<br>☐ TP100RCDS<br>☐ TP100RCSS | ☐ address labels<br>☐ corporate return address label<br>☐ adoption announcement<br>☐ baptism/christening<br>☐ bar/bat mitzvah<br>☐ boy birth announcement |

| # of Photos 914 | # of Envelopes 915 | # of Inks 916 | Class 917 |
|---|---|---|---|
| ☐ 0<br>☐ 1<br>☐ Multi | ☐ 0<br>☐ 1 | ☐ 1<br>☐ Multi | ☐ Adoption Birth Announcements<br>☐ Adoption Photo Birth Announcements<br>☐ Baby Announcements<br>☐ Baby Shower Invitations |

[Apply]

[Save Changes] [Activate]

SYSTEM AND METHOD FOR MANAGING QUANTITY TIERS USING ATTRIBUTES IN AN ONLINE STATIONERY DESIGN SYSTEM

BACKGROUND

1. Field of the Invention

This invention relates generally to the field of network data processing systems. More particularly, the invention relates to an improved architecture and method for managing quantity tiers using attributes in an online stationery design system.

2. Description of the Related Art

Figure 1:
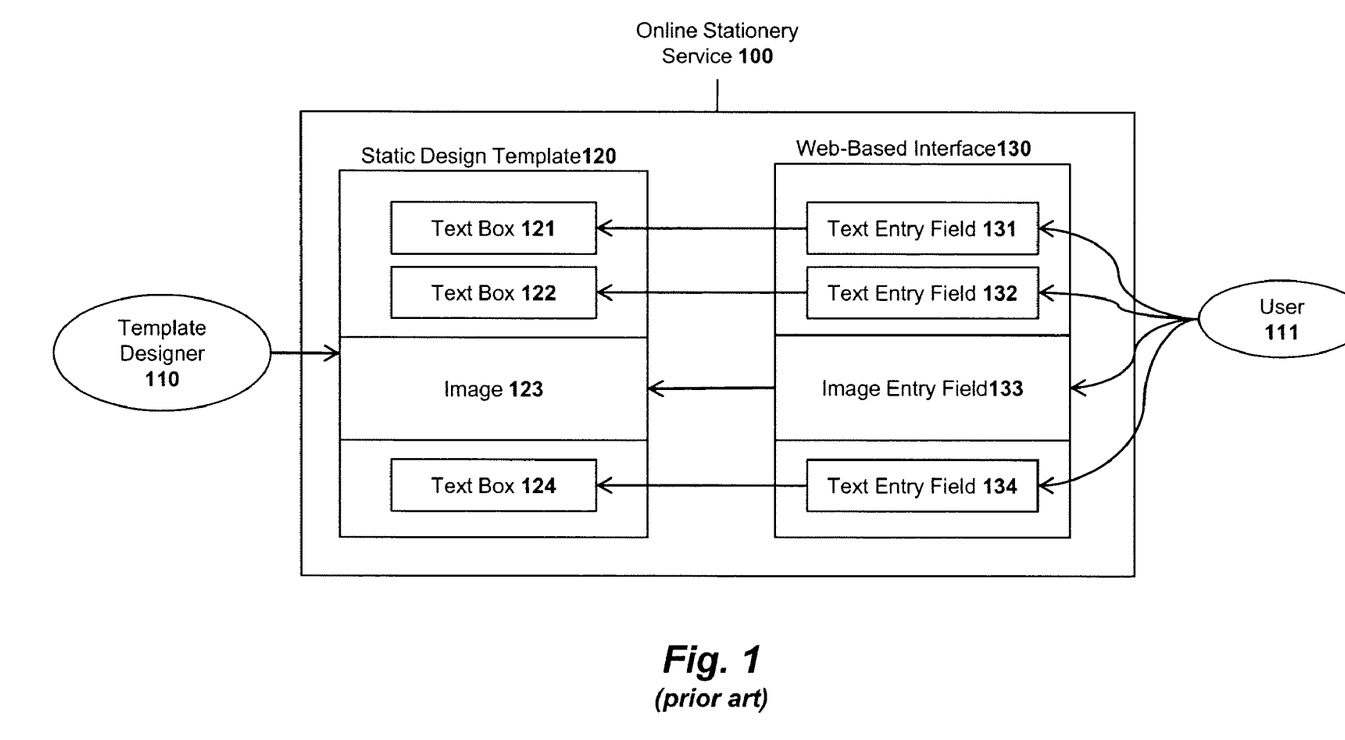
FIG. 1 illustrates a prior art system architecture for generating online stationary.

Web-based systems for designing stationery such as wedding invitations, birth announcements, birthday party invitations, etc, are currently available over the Internet. As illustrated in FIG. 1, in current Web-based systems, a template designer 110 creates a static design template 120 for each type of stationery. The static design template 120 includes a plurality of text box regions 121, 122, 124 representing locations where text is to be displayed and potentially one or more image regions 124 representation locations where images uploaded by the user are to be displayed.

The static design template 120 is personalized via a Web-based user interface 130 made accessible to end users 111 over the Internet. The Web-based interface typically takes the form of a Web page which is downloaded to a client computer of the end user 111. The Web page includes a plurality of text entry fields 131, 132, 134 which correspond to the text box regions 121, 122, 124 within the design template, respectively. The Web page may also include one or more image entry fields 133 corresponding to the image regions 123 of the static design template 120. Images may be uploaded to the image entry field 133 and positioned within the image region 123 of the design template 120.

Some Web-based systems for designing stationery provide tiered pricing structures in which the per-item cost for stationery is reduced for larger purchases. By way of example, under a tiered pricing structure, an order of between 25 and 49 birthday announcements may cost $5.00 per announcement (assuming a minimum order of 25); an order of between 50 and 74 birthday announcements may cost $3.75 per announcement; an order of between 75 and 99 birthday announcements may cost $3.30 per announcement; and an order of 100 or more birthday announcements may cost $3.00 per announcement.

Figure 2:
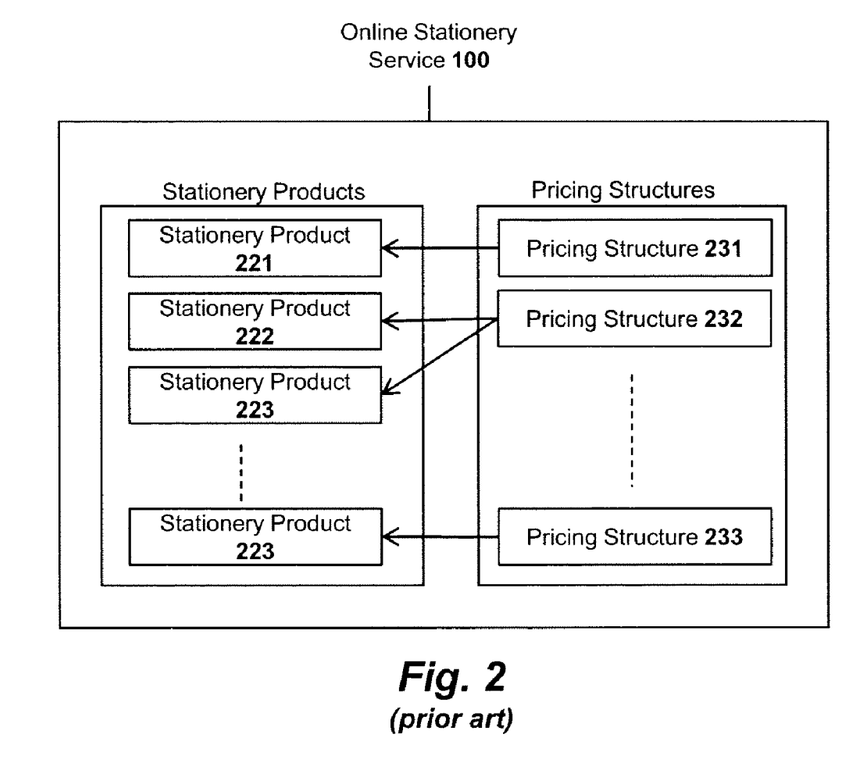
FIG. 2 illustrates a prior art system in which pricing structures are manually associated with stationery products.

One problem with the pricing structures used on current Web-based stationery systems, however, is that they are hard-coded for each individual stationery product and, consequently, do not scale well for a large number of stationery products. For example, as illustrated in FIG. 2, pricing structure 231 is associated with stationery product 221; pricing structure 232 is associated with stationery products 222 and 223; and pricing structure 233 is associated with stationery product 223. Thus, when a new stationery product is created, either an existing pricing structure is manually identified and associated with the new stationery product, or a new pricing structure is manually created. Identifying an appropriate pricing structure based on a manual comparison of similar stationery products, and/or manually creating a new pricing structure for each new stationery product consumes a significant amount of time and may result in inconsistencies between pricing structures for similar stationery types.

Accordingly, what is needed is an improved system for designing and generating online stationery. What is also needed is an improved system and method for selecting a pricing schedule for online stationery products.

SUMMARY

One embodiment of the invention identifies an appropriate pricing structure for a new stationery design by automatically comparing attributes of the stationery design with attributes of existing stationery designs which have assigned pricing structures. In one embodiment, the attributes are prioritized such that certain attributes are weighted more than other attributes when determining an appropriate price structure. For example, in this embodiment, a search is initially performed for a price structure of an existing stationery product which shares all of the same attributes as the new stationery product. If a match is not found, then the least significant attribute is removed from the set of search criteria and another search is performed. This process continues until an existing pricing structure of a stationery product which shares the most significant attributes of the new stationery product is identified. Once the pricing structure is identified, the designer has the option to modify the pricing structure and create a new pricing category, which is then stored in a database with other pricing categories.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing quantity tiers using attributes in an online stationery system. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

One embodiment of the invention identifies an appropriate pricing structure for a new stationery design by automatically comparing attributes of the stationery design with attributes of existing stationery designs which have assigned pricing structures. In one embodiment, the attributes are prioritized such that certain attributes are weighted more than other attributes when determining an appropriate price structure. For example, in this embodiment, a search is initially performed for a price structure of an existing stationery product which shares all of the same attributes as the new stationery product. If a match is not found, then the least significant attribute is removed from the set of search criteria and another search is performed. This process continues until an existing pricing structure of a stationery product which shares the most significant attributes of the new stationery product is identified. Once the pricing structure is identified, the designer has the option to modify the pricing structure and create a new pricing category, which is then stored in a database with other pricing categories.

It should be noted that the term "stationery" is used herein to refer to greeting cards, invitations (e.g., wedding, birthday invitations, etc), and any other form of written communication and/or images printed on a medium (e.g., paper, fabric, etc) using any form of printing device.

Figure 3:
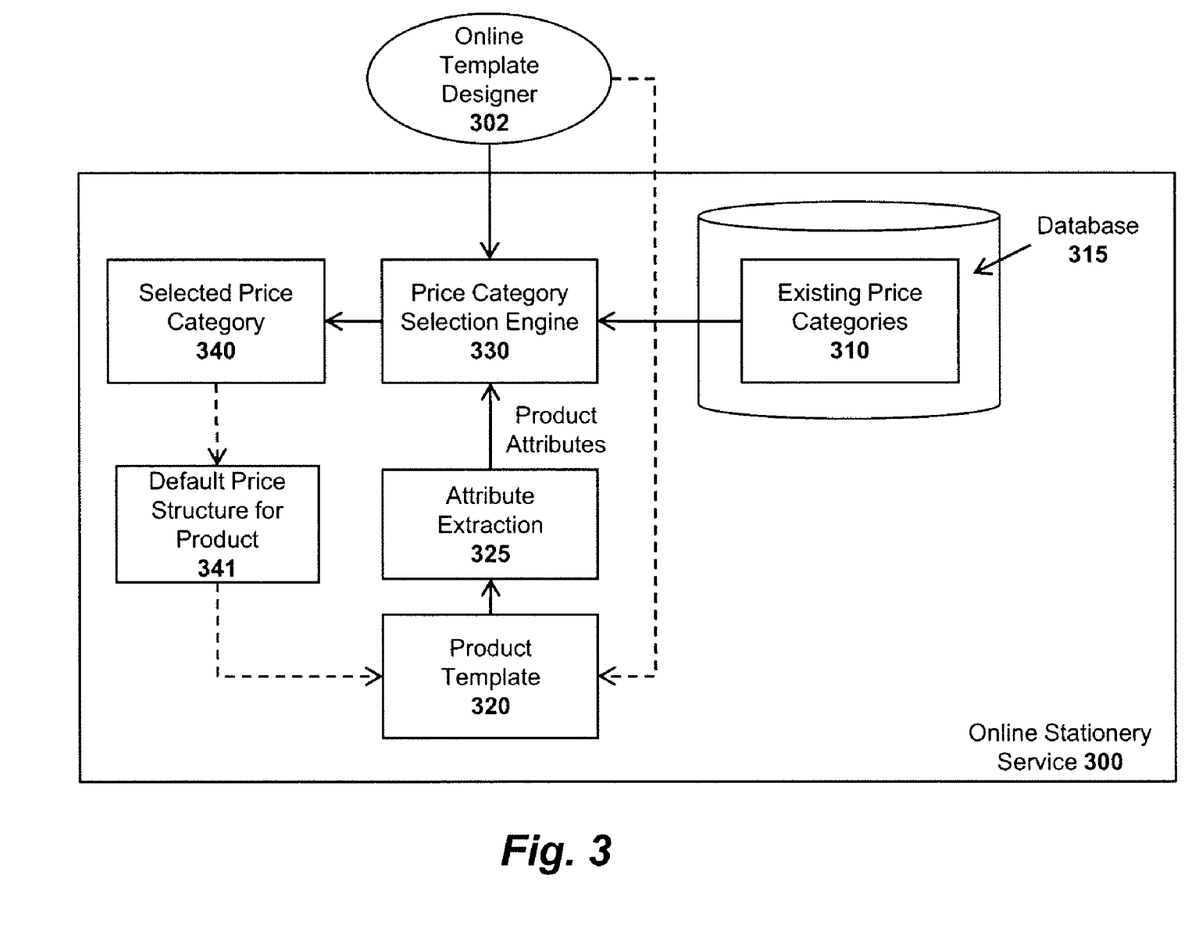
FIG. 3 illustrates one embodiment of a system for automatically selecting a price structure for a stationery product.

FIG. 3 illustrates one embodiment of a system for managing a database 315 of stationery price categories 310 and automatically identifying appropriate price categories for new stationery products 320. As shown in FIG. 3, this embodiment comprises a database 315 of existing price categories 310 and a price category selection engine 330 for selecting a price category based on attributes extracted from a stationery product template 320. As mentioned above, in one embodiment, each price "category" identifies a particular tiered price structure in which the per-unit price decreases with larger orders. In operation, once a new stationery product 320 is created, attribute extraction logic 325 executed on the online stationery service 300 extracts a set of attributes from the product template 320. In one embodiment, the attribute extraction logic 325 extracts the following eight attributes:

1. Fulfillment Item Type: This attribute identifies the type of printing required for the stationery order. For example, some stationery orders may be printed on a standard digital press such as an HP Indigo™ printer. By contrast, other types of orders must be printed on a letter press printer or a thermal imaging (thermography) printer. This variable is significant because some forms of printing (e.g., letter press, thermal imaging) are significantly more expensive than other forms (e.g., digital press). Other possible values for this attribute include address labels, card kits, gift tags, box sets, and meta sample cards.

2. Card Size: This attribute specifies the size of the stationery product. Examples include (but are not limited to) 4.1"× 5.25" flat; 5"×7" flat, 4"×9.25" flat; and 4.25"×5.5" folded, to name a few. Gift tags and address labels may also be included as Card Size attributes. In one embodiment, default card sizes are associated with these items.

3. Paper Type: This attribute specifies the type of paper used for the stationery product. A virtually unlimited number of paper types may be provided including, but not limited to 110 lb White Smooth Matte Cardstock; 110 lb Recycled White Matte; 110 lb White Textured Cardstock; 80 lb White Textured Cardstock; BG White A2; Brown A6; Recycled White 10; Recycled White Square.

4. Occasion: This attribute specifies the type of occasion for which the stationery is used. Examples of occasion types include, but are not limited to, birth announcements, birthdays, wedding invitations, holiday parties, and baby shower invitations, to name a few.

5. Number of Photos: This attribute specifies the number of photos used in the stationery product.

6. Number of Envelopes: This attribute specifies the number of envelopes used in the stationery product.

7. Number of Inks: This attribute specifies the number of inks required for print the stationery product. The value of this attribute may be one (for black) or more (for color).

8. Class: This attribute specifies a category for the stationery type. For example, all wedding invitations fall under the "wedding invitation" class and all baby shower invitations fall under the "baby shower invitation" class. In one embodiment, the "class" variable is similar to "occasion" but provides more granularity. For example, the "occasion" may be wedding, but the class may specify "signature wedding invitation." In one embodiment, the "class" variables are used as keywords within the search engine of the online stationery service 300.

In one embodiment, the attributes are weighted/prioritized in the order listed above; that is, with "Fulfillment Item Type" having the highest priority and "Class" having the lowest priority and the other attributes having relative priorities based on their position within the list. In one embodiment, the price category selection engine 330 uses the attributes extracted from the product template 320 and the attribute prioritization to find the closest match between the attributes extracted from the product template 320 and the attributes from existing price categories 310.

Figure 4:
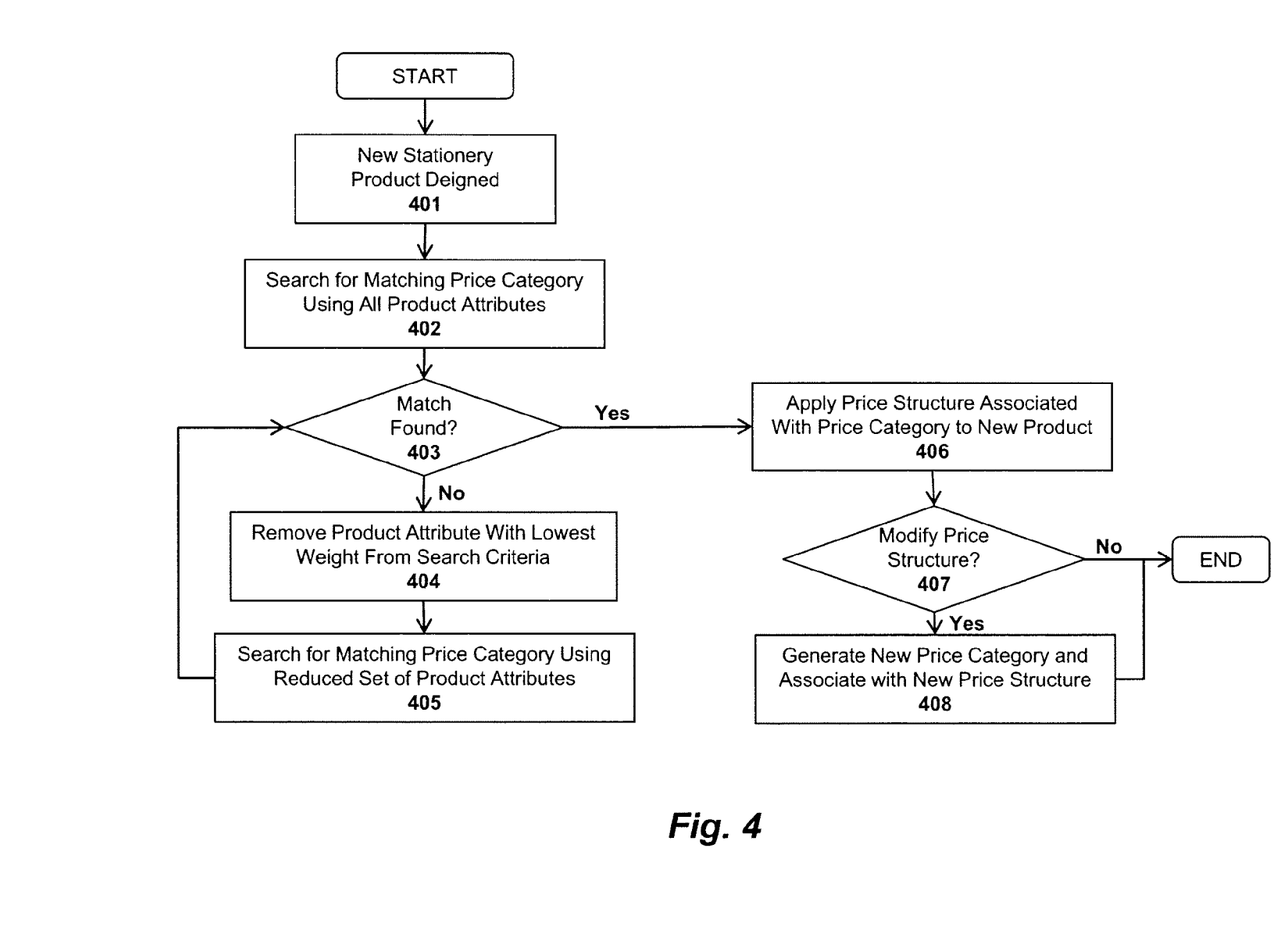
FIG. 4 illustrates one embodiment of a method for automatically selecting a price structure for a stationery product.

FIG. 4 illustrates one embodiment of a method executed by the price category selection engine 330 for selecting an appropriate price category and/or structure. At 401, a new stationery product is designed 401 by a stationery designer. At 402, the price category selection engine 330 searches for a matching price category within the existing price categories 310 stored on the database 315 using all of the attributes of the new stationery product. If a match is not initially found, then at 404, a product attribute with the lowest priority/weight is removed from the search criteria. By way of example, if a match is not found for the initial 8 attributes listed above, then the lowest priority attribute, "Class," is removed from the search criteria. At 405, the search is performed again using the reduced set of product attributes (i.e., 7 attributes after "Class" has been removed). If a match is still not found, at 403, then the next lowest priority attribute is removed at 404 (e.g., "Number of Links" from the list above). The process continues in this manner until a match is found at 403.

In an alternate embodiment, instead of starting with the complete list of attributes and removing attributes if a match is not found, the category selection engine 330 implements a tree-search algorithm, starting from the highest priority attribute ("Fulfillment Item Type") and working down the list of attributes until a match is not found. For example, the category selection engine 330 identifies matching price categories using the highest priority attribute, then filters the results using the next highest priority attribute, and so on. When a match is not found for the next attribute on the list, the set of matching attributes are used to identify an appropriate price category and price structure.

Regardless of how the search is performed, when a match is found, determined at 403, then the price structure associated with the price category is associated with the new product template at 406. At 407, the designer is given the opportunity to modify the imported price structure. If the designer chooses to do so, then at 408 a new price category is created using all (or a subset) of the variables of the new stationery product. The new price category and associated price structure are then stored within the database 315 with the other price categories/structures. Once an appropriate price structure has been identified, it is associated with the new stationery product template on the online stationery service 300. Following the association, when an end user selects the stationery product from a Web-based GUI provided by the stationery service 300, the price structure is provided to the end user.

It should be noted that the foregoing set of attributes are used for the purpose of illustration only. The underlying principles of the invention are not limited to any particular set of attributes, or any particular prioritization scheme for the attributes.

One embodiment of the invention applies discounts to stationery products using price categories (rather than applying discounts directly to individual stationery products). In the example shown in FIG. 5, within database 521, Discount 1 is associated with price categories X, Y, and X; Discount 2 is associated with price category M; and Discount 3 is associated with price categories A and B. By way of example, Discount 1 may be 10% off the standard price; Discount 2 may be $10 off purchases of $150 or more; and Discount 3 may be 25% off the standard price. Applying discounts to price categories in this manner is significantly more efficient and provides a more precise level of granularity than applying discounts directly to products. For example, if the online stationery service 300 is receiving a discount on a particular type of paper from a paper supplier, that discount may be easily passed on to end users by searching and identifying all price categories that include that type of paper. Various other discounts may be passed on to end users in a similar manner.

Figure 5:
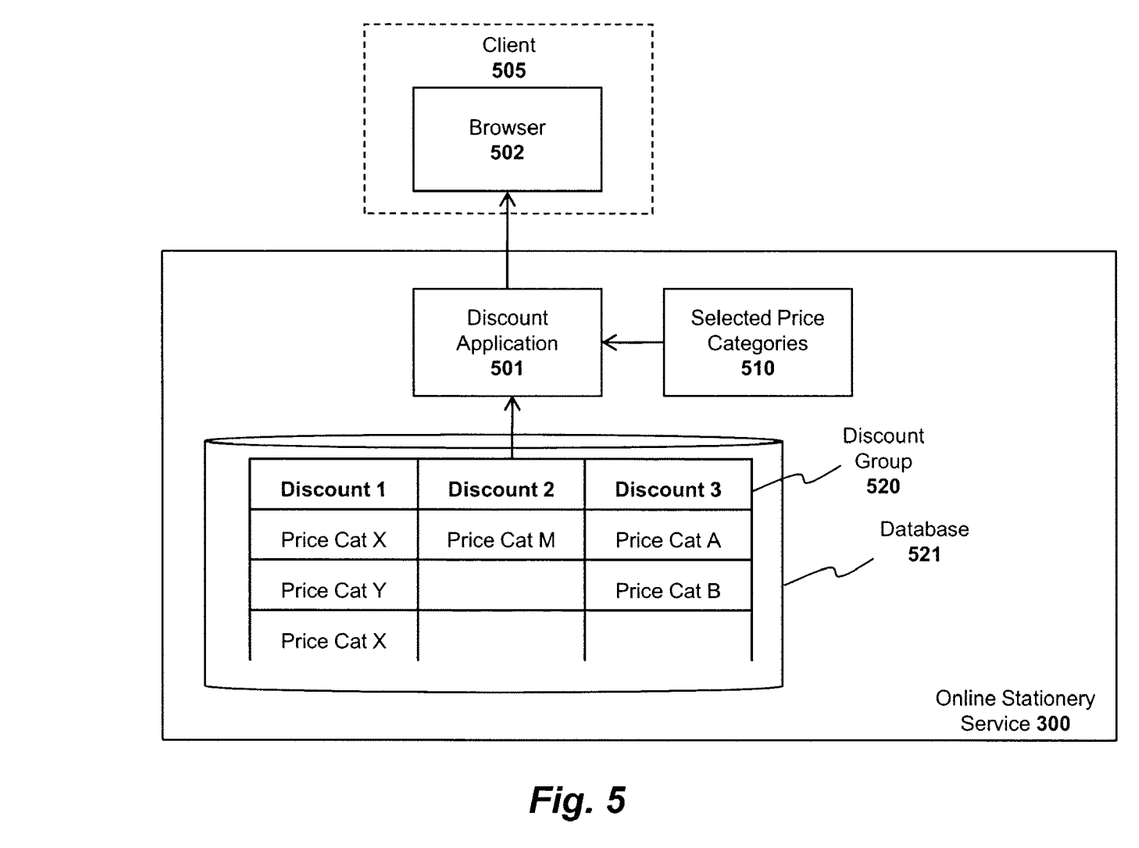
FIG. 5 illustrates one embodiment of a system for applying discounts to price categories.

In one embodiment, the discounts are logically arranged into one or more discount groups 520 within the database 521. Each discount group is identified by a name and/or identification code, and is assigned a start date and an end date. For example, discount group 520 may be identified as "Holiday Season 2009" and may be valid from Nov. 26, 2009 to Jan. 2, 2010. All of the discounts specified within the discount group are valid during the period of time between the start date and the end date. Thus, discount groups may be created and stored prior to the time period during which they are in effect. When the start date is reached, the In operation, when transmitting price information for a particular stationery product or group of products to a browser 502 on a user's client computer 505, a discount application module 501 searches the database 521 on the online stationery service 300 to determine if a discount applies to the price categories 510 associated with stationery products selected by the user. If so, the discount application module 501 automatically applies the discounts and transmits the results to the user's browser 502. For example, if the normal price for 50 units of a particular stationery product is $100 and, based on the price category, a discount of 10% off applies, then the discount application module 501 will perform the calculation and transmit a discounted amount of $90 within a Web page to the end user's browser. In one embodiment, the regular price is displayed within the Web page along with the discounted amount.

Figure 6:
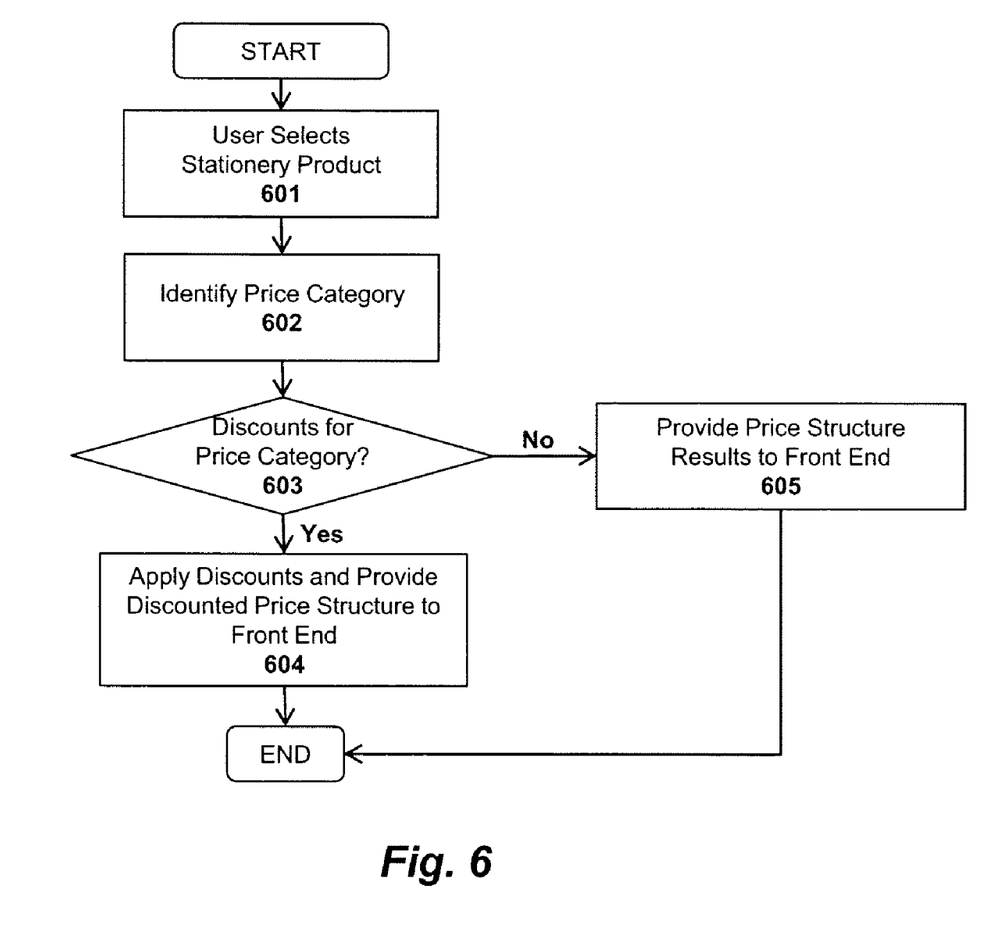
FIG. 6 illustrates one embodiment of a method for applying discounts to price categories.
Figure 11:
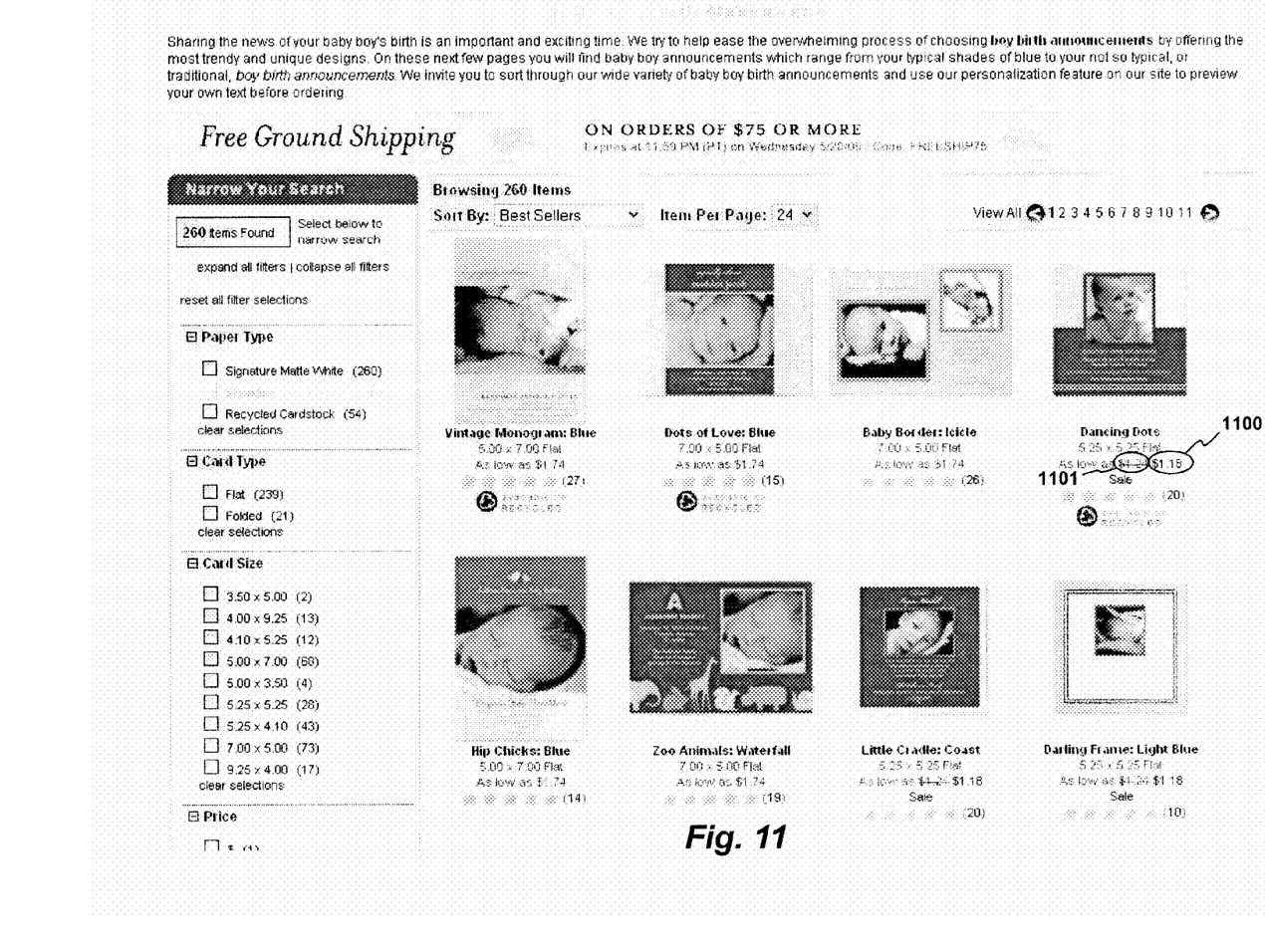
FIG. 11 illustrates the manner in which discounts are displayed within a Web-based GUI.

FIG. 6 illustrates one embodiment of a method for applying discounts. At 601, the end user selects a particular stationery product or group of stationery products via manipulation of a mouse, keyboard, or other cursor control device. At 602 the price category associated with each stationery product is identified. At 603 a determination is made as to whether discounts apply for the price category and, if not, the standard price structure is provided at 605. If a discount is associated with the price category of the stationery product, then at 604 the discounts are applied and the discounted price is provided to the user within a Web page. FIG. 11 illustrates how the discount amount 1100 is displayed within the Web page along with the non-discounted price 1101 (i.e., with a slash through the non-discounted price).

Throughout the discussion above, various details have been omitted to avoid obscuring the pertinent aspects of the invention. For example, in an embodiment of the invention in which the user connects to the online stationery service 300 via a Web browser, various well known functional modules are executed on the online stationery service 300 to receive user input, process the input and dynamically generate Web pages containing the results. The Web pages may be formatted according to the well known HyperText Markup Language ("HTML") or Extensible HTML ("XHTML") formats, and may provide navigation to other Web pages via hypertext links. Web pages are requested, dynamically generated, and transmitted from Web servers on the online stationery service 300 using the Hypertext Transfer Protocol (HTTP). In one embodiment, the Web server used to implement the embodiments of the invention is a Ngnix, Apache web server running on Linux with software programmed in PHP using a MySQL database. It should be noted, however, that the underlying principles of the invention are not limited to any particular type of communications protocol.

Figure 7:
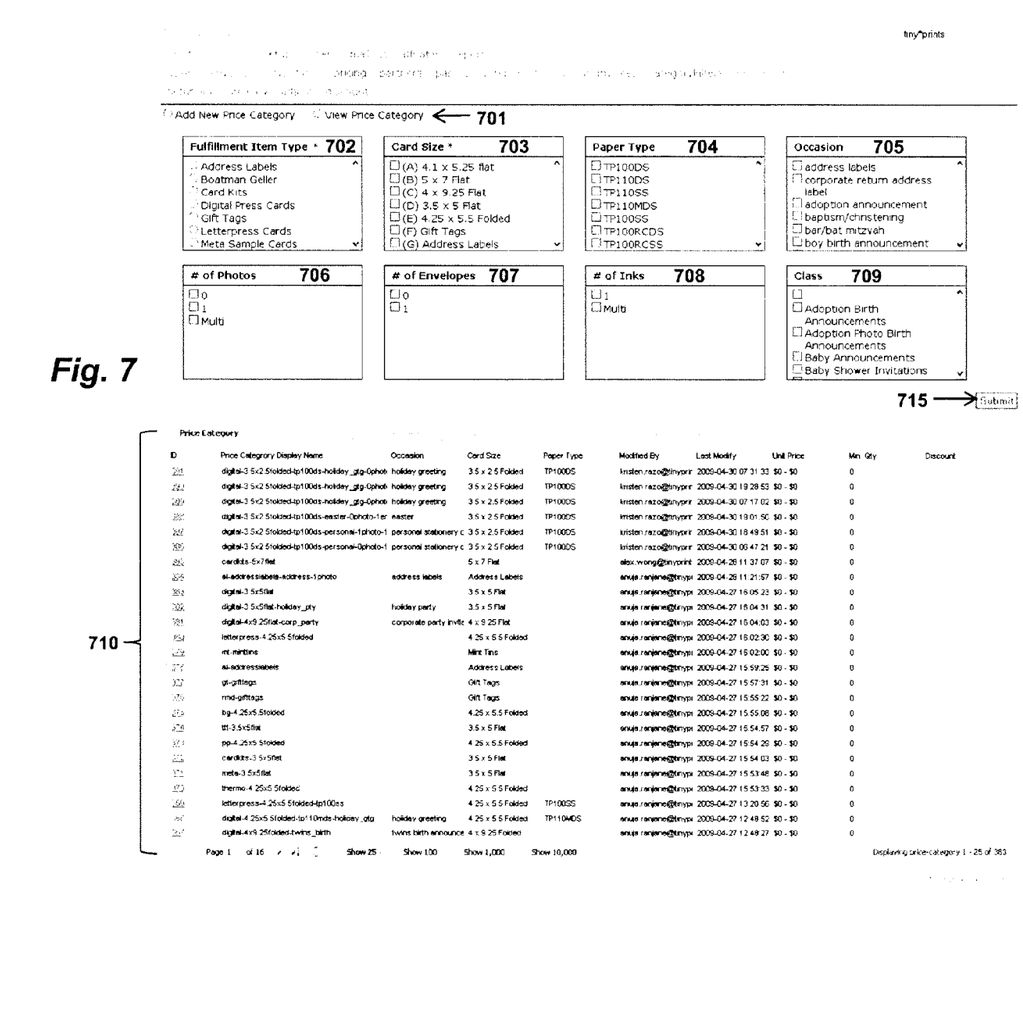
FIG. 7 illustrates one embodiment of a Web-based graphical user interface (GUI) for viewing and adding price categories using a plurality of product attributes.

Various Web-based graphical user interface (GUI) features for managing price categories and discounts are illustrated in FIGS. 7-14. FIG. 7 illustrates a GUI for viewing existing price categories and adding new price categories (depending on which of two radio buttons 701 are selected). The GUI includes a plurality of selection boxes 702-709 for selecting attributes. Each selection box includes selectable items for a particular attribute type. For example, selection box 702 includes selectable elements for the "Fulfillment Item Type" attribute; selection box 703 includes selectable elements for the "Card Size" attribute; selection box 704 includes selectable elements for the "Paper Type" attribute; selection box 705 includes selectable elements for the "Occasion" attribute; selection box 706 includes selectable elements for the "Number of Photos" attribute; selection box 707 includes selectable elements for the "Number of Envelopes" attribute; selection box 708 includes selectable elements for the "Number of Inks" attribute; and selection box 709 includes selectable elements for the "Class" attribute.

In one embodiment, the elements within each selection box are selected by placing a check in a check box and/or selecting a radio button. A radio button allows the user to choose only one of a predefined set of elements. By contrast, check boxes allow multiple elements within a selection box to be selected. In FIG. 7, radio buttons are employed within the "Fulfillment Item Type" box (thereby allowing the user to select only one fulfillment item type) and check boxes are used in the remaining selection boxes.

Selecting one or more of the radio buttons and check boxes generates a filtered list 710 of all price categories corresponding to the selections. For example, selecting "digital press cards" as the fulfillment item type and "5×7 flat" as the card size causes only price categories having these attributes to appear in the list 710. The list may be generated dynamically following each selection or, alternatively, a "submit" button 715 may be provided to enter the user's combined selections. Radio buttons 701 at the top of the GUI provide options for viewing price categories or adding new price categories. In either case, selecting the radio buttons and check boxes causes the list 710 to be filtered as described above.

Figure 8:
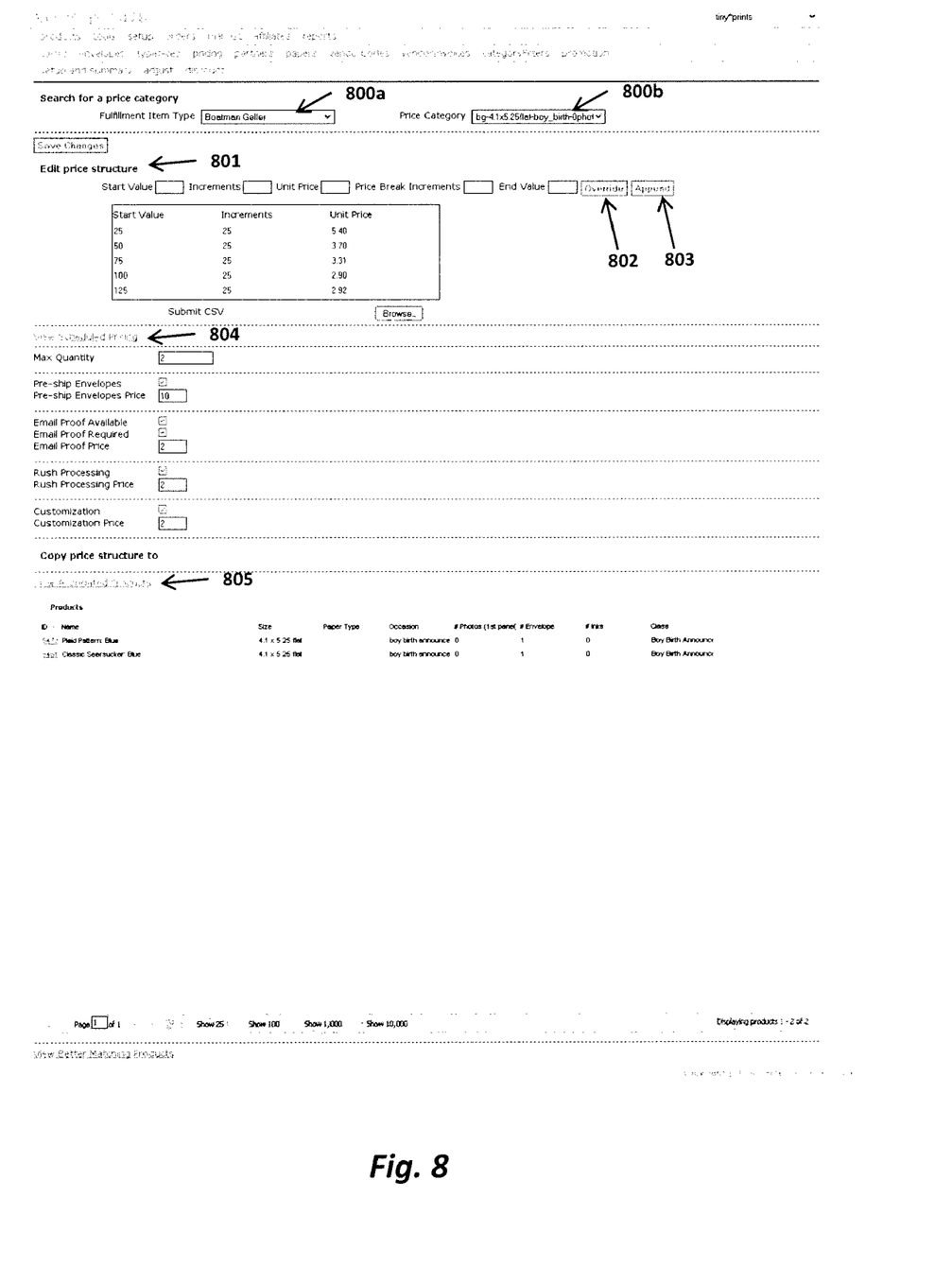
FIG. 8 illustrates one embodiment of a Web-based GUI for editing and creating new pricing structures for price categories.

In one embodiment, to add a new price category, a user selects the radio button for "add new price category" 701, selects a fulfillment order type and one or more additional attributes, and then chooses the submit button 715. When adding a new price category, the filtered list 710 will ultimately result in no entries (because the combination of attributes is new, and therefore does not correspond to an existing price category). When this occurs, in response to the user selecting the "submit" button 715, a GUI such as that displayed in FIG. 8 is generated. The GUI shown in FIG. 8 may also be opened by selecting a particular price category from within region 710 of FIG. 7. The GUI shown in FIG. 8 includes a region 800*a* for displaying the selected Fulfillment Item Type and the Price Category name 800*b*. In one embodiment, the new price category name 800*b* is automatically generated by appending the different attribute names selected for the price category in FIG. 7.

A price structure region 801 is provided for entering and/or editing a price structure associated with the new and/or existing price category, respectively. Data fields are provided allowing the user to enter a start value, an increment value, a unit price, price break increments and an end value. The start value specifies the minimum number of units which must be ordered to get the associated unit price. For example, in FIG. 8, a user must order at least 75 units to be charged a unit price of $3.31. The "increments" value specifies a range above and including the start value which is subject to the same unit price. For example, in FIG. 8, the $3.31 price applies to 75 through 99 units (using an incremental value of 25).

An override button 802 is provided to allow the user to override existing entries in the price structure. In one embodiment, when a user enters a start value corresponding to an existing start value, the existing start value will be overridden upon selection of the override button. An append button 803 allows the user to append a new entry to the price structure. For example, a new entry with a start value of 150 and a unit price less than $2.92 may be appended to the end of the price structure shown in FIG. 8. At the bottom of FIG. 8 is a region 805 which displays the products associated with the displayed price category.

Figure 9:
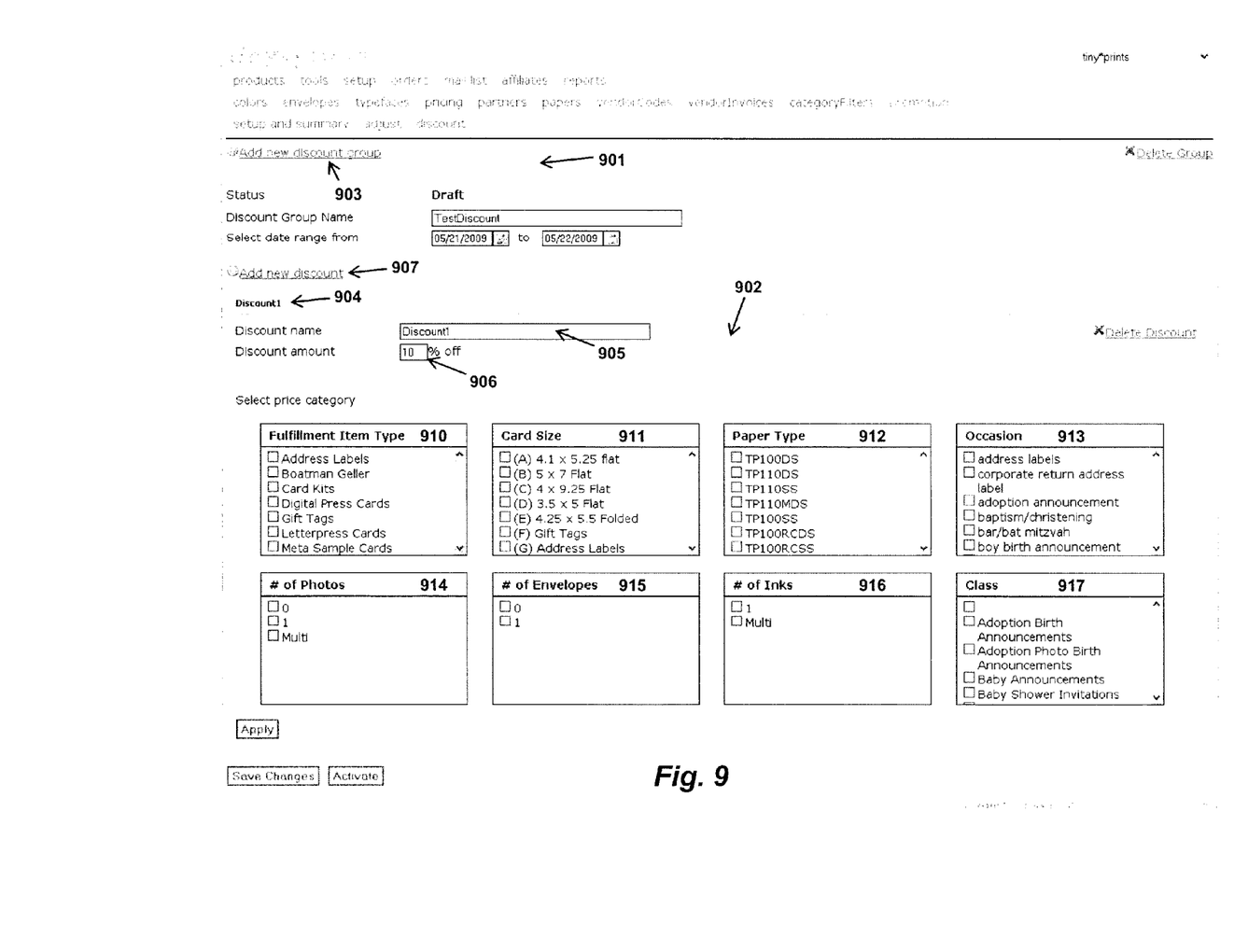
FIG. 9 illustrates one embodiment of a Web-based GUI for setting a discount for one or more price categories.

FIG. 9 illustrates a GUI for entering a new discount group comprised of a first region 901 for entering a discount group name and date range, and a second region 902 for specifying and displaying discounts be included in the discount group. A first hyperlink 903 is provided for entering a new discount group and a second hyperlink 907 is provided for entering a new discount within the current discount group. Upon selection of the second hyperlink 907, a new tab 904 is generated for the new discount. The tabs are arranged adjacent to one another within the GUI. Selecting a tab causes the selected attributes, discount name and discount amount to be displayed within the second region 902. A name field 905 is provided for entry of a discount name, and a discount amount field 906 is provided for entering the amount of the discount. The price categories for which the discount applies may be specified by selecting radio buttons and check boxes within attribute selection boxes (as described above with respect to FIG. 7).

Figure 10:
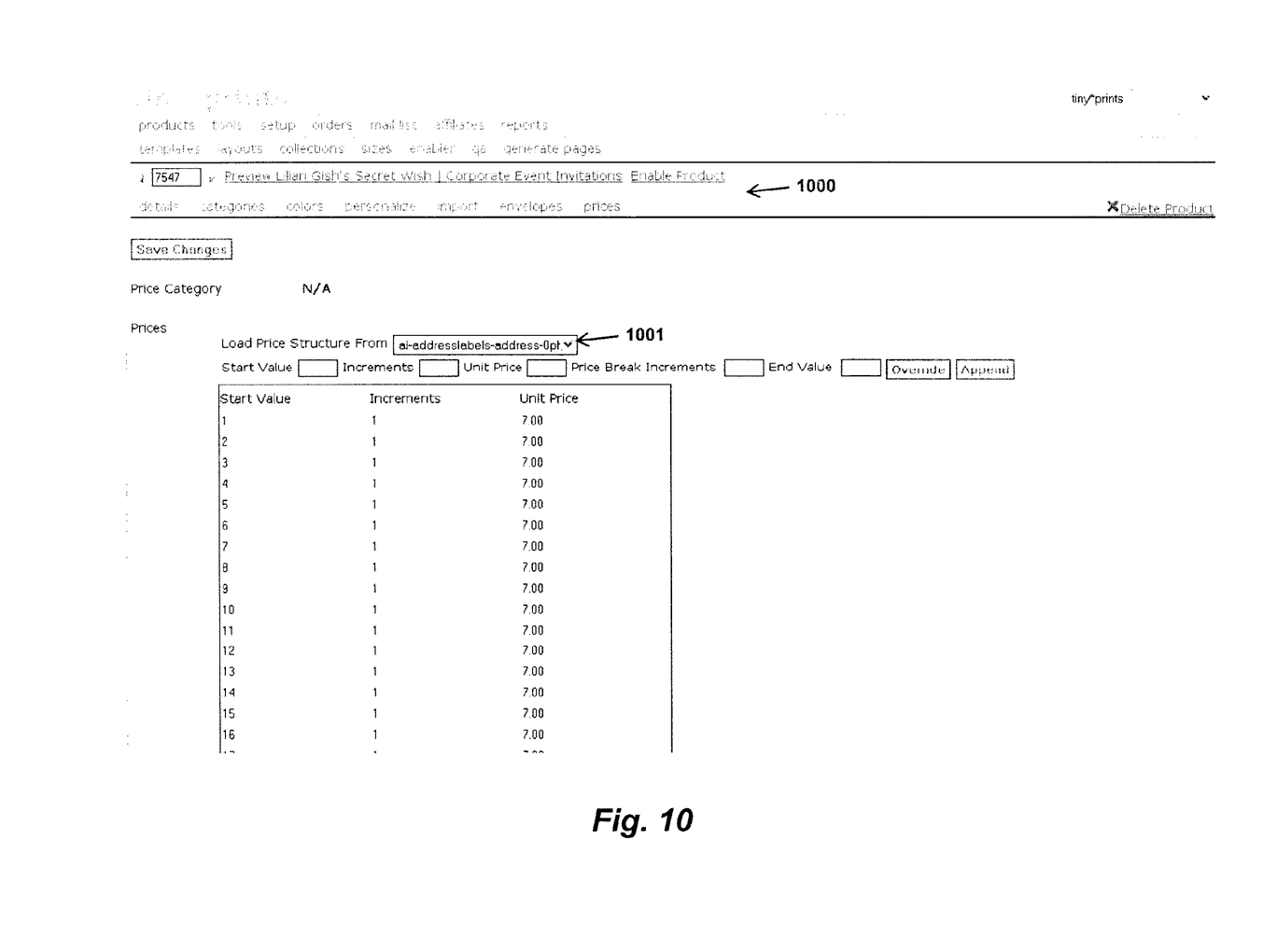
FIG. 10 illustrates one embodiment of a Web-based GUI for viewing and editing a price structure associated with a stationery product.

FIG. 10 illustrates a GUI for overriding a price structure assigned to a stationery product. As described above, the embodiments of the invention described herein may automatically assign a price category to a product based on the product attributes. However, the assigned price structure may be overridden using the Web-based GUI shown in FIG. 10. A particular product is selected within region 1000 (product 7547) and a drop down menu 1001 is provided to associate a price structure with the selected product. Also provided are the same set of data entry fields as shown in FIG. 8 to allow the user to edit the imported price structure by overriding and/or appending entries.

Throughout the discussion above, various details have been omitted to avoid obscuring the pertinent aspects of the invention. For example, the different graphical user interface (GUI) features and other Web-based interactions described herein are supported by presentation logic and session management logic executed on the online stationery service using various, well known functional modules for supporting Web-based communication. These modules are configured to receive user input, process the input, access one or more databases, interact with one or more other modules described above, and dynamically generate Web pages containing the results, as shown in the figures. The Web pages are then transmitted to a client computer and rendered on a Web browser such as Internet Explorer™ or Mozilla Firefox™ (operated by an online template designer or end user). The Web pages may be formatted according to the well known HyperText Markup Language ("HTML") or Extensible HTML ("XHTML") formats, and may provide navigation to other Web pages within the Online Stationery Service via hypertext links. One embodiment utilizes Dynamic HTML ("DHTML"), a collection of technologies used together to create interactive Web sites by using a combination of a static markup language (e.g., HTML), a client-side scripting language (e.g., JavaScript), a presentation definition language (e.g., CSS), and the Document Object Model ("DOM").

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed is:

1. A computer-implemented method for automatically associating a price structure with an online stationery product comprising:

defining a plurality of product attributes for stationery products, wherein the plurality of product attributes comprises one or more selected from the group consisting of fulfillment order types, card sizes, paper types, occasions, number of photos, number of envelopes, number of inks, and stationery classes;

prioritizing the plurality of product attributes;

defining a plurality of price categories, each of the price categories associated with a specified set of the product attributes and having a tiered price structure;

creating a new stationery product in response to user input, the new stationery product having a first set of product attributes associated therewith; and identifying, by a computer system, an appropriate price category for the new stationery product by performing the operations of:

searching for a matching price category within the plurality of price categories using all of the first set of product attributes;

if a matching price category is found using the first set of product attributes, associating the price structure for the matching price category with the stationery product;

if a matching price category is not found, removing a lowest priority attribute from the first set of product attributes to produce a second set of product attributes;

searching again for a matching price category using the second set of product attributes; and     if a matching price category is found using the second set of product attributes, associating the price structure for the matching price category with the stationery product;

if a matching price category is not found using the second set of product attributes, continuing to remove a next lowest priority attribute from the first set of product attributes and searching until a matching price category is found.

2. The method as in claim 1, further comprising:

if a matching price category is not found using all of the first set of product attributes, creating, by the computer system, a new price category using the attributes for the new product.

3. The method as in claim 2 wherein creating a price category comprises:

providing, by the computer system, a graphical user interface (GUI) comprised of a plurality of selection boxes for selecting product attributes, wherein each selection box corresponds to a particular product attribute.

4. The method as in claim 3 wherein each of the selection boxes comprise a listing of attributes selectable via radio buttons or check boxes.

5. The method as in claim 4 wherein at least one of the selection boxes comprises a listing of attributes selected from the following attribute types:

fulfillment order types;
card sizes;
paper types;
occasions;
number of photos;
number of envelopes;
number of inks; and
stationery classes.

6. The method as in claim 1 further comprising:

associating a discount with one or more of the price categories;

determining if a stationery product selected by a user is associated with a price category with which the discount is associated; and automatically applying the discount to the selected stationery product by the computer system.

7. A system comprising a non-transitory memory for storing program code and a processor for processing the program code to perform the operations of:

defining a plurality of product attributes for stationery products, wherein the plurality of product attributes comprises one or more selected from the group consisting of fulfillment order types, card sizes, Paper types, occasions, number of photos, number of envelopes, number of inks, and stationery classes;

prioritizing the plurality of product attributes;

defining a plurality of price categories, each of the price categories associated with a specified set of the product attributes and having a tiered price structure;

creating a new stationery product in response to user input, the new stationery product having a first set of product attributes associated therewith; and identifying an appropriate price category for the new stationery product by performing the operations of:

searching for a matching price category within the plurality of price categories using all of the first set of product attributes;

if a matching price category is found using the first set of product attributes, associating the price structure for the matching price category with the stationery product;

if a matching price category is not found, removing a lowest priority attribute from the first set of product attributes to produce a second set of product attributes;

searching again for a matching price category using the second set of product attributes; and     if a matching price category is found using the second set of product attributes, associating the price structure for the matching price category with the stationery product;

if a matching price category is not found using the second set of product attributes, continuing to remove a next lowest priority attribute from the first set of product attributes and searching until a matching price category is found.

8. The system as in claim 7, comprising additional program code to cause the processor to perform the operations of:

if a matching price category is not found using all of the first set of product attributes, then creating a new price category using the attributes for the new product.

9. The system as in claim 8 wherein creating a price category comprises:

providing a graphical user interface (GUI) comprised of a plurality of selection boxes for selecting product attributes, wherein each selection box corresponds to a particular product attribute.

10. The system as in claim 9 wherein each of the selection boxes comprise a listing of attributes selectable via radio buttons or check boxes.

11. The system as in claim 10 wherein at least one of the selection boxes comprises a listing of attributes selected from the following attribute types:

fulfillment order types;
card sizes;
paper types;
occasions;
number of photos;
number of envelopes;

number of inks; and stationery classes.

12. The system as in claim 7, further comprising additional program code to cause the processor to perform the operations of:

associating a discount with one or more of the price categories;

determining if a stationery product selected by a user is associated with a price category with which the discount is associated; and automatically applying the discount to the selected stationery product.

\* \* \* \* \*